Figure 1:
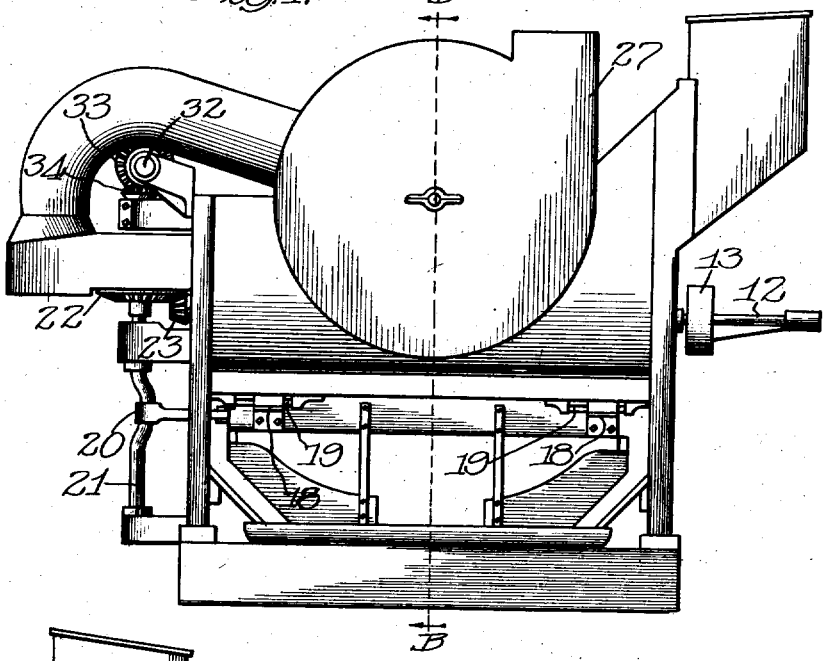

F. HALL.

CLEANING APPARATUS FOR CORN SHELLERS, &c.

APPLICATION FILED JAN. 27, 1912.

Reissued May 14, 1912. 13,418.

2 SHEETS—SHEET 1.

Witnesses:
G. W. Dougrus Jr.
R. Burkhardt.

Inventor:
Frank Hall
by John Howard McElroy
his Atty.

COLUMBIA PLANOGRAPH CO., WASHINGTON, D. C.

F. HALL.

CLEANING APPARATUS FOR CORN SHELLERS, &c.

APPLICATION FILED JAN. 27, 1912.

Reissued May 14, 1912.

13,418.

2 SHEETS—SHEET 2.

Witnesses:
G. W. Romaris Jr.
R. Burkhardt.

Inventor:
Frank Hall,
by John Howard McElroy
his Atty.

COLUMBIA PLANOGRAPH CO., WASHINGTON, D. C.

UNITED STATES PATENT OFFICE.

FRANK HALL, OF FAIRBURY, ILLINOIS, ASSIGNOR TO KING & HAMILTON COMPANY, OF OTTAWA, ILLINOIS, A CORPORATION OF ILLINOIS.

CLEANING APPARATUS FOR CORN-SHELLERS, &c.

13,418. Specification of Reissued Letters Patent. Reissued May 14, 1912.

Original No. 878,725, dated February 11, 1908, Serial No. 319,035. Application for reissue filed January 27, 1912. Serial No. 673,945.

*To all whom it may concern:*

Be it known that I, FRANK HALL, a citizen of the United States, and resident of Fairbury, in the county of Livingston and State of Illinois, have invented certain new and useful Improvements in Cleaning Apparatus for Corn-Shellers, &c., of which the following is a specification.

My invention is concerned with a novel cleaning apparatus designed primarily for use in corn shellers, but which may, of course, be used in other similar machinery. It is concerned with a novel construction and arrangement of the essential elements of such an apparatus whereby a short path is obtained between the winnower fan and the exhause fan, thus obtaining a more direct and stronger up-draft through the screens and material just as it falls from the sheller, and likewise economizing in the size and cost of the machine, while increasing its efficiency.

To illustrate my invention, I annex hereto two sheets of drawings, in which the same reference characters are used to designate identical parts in all the figures, of which,—

Figure 2:
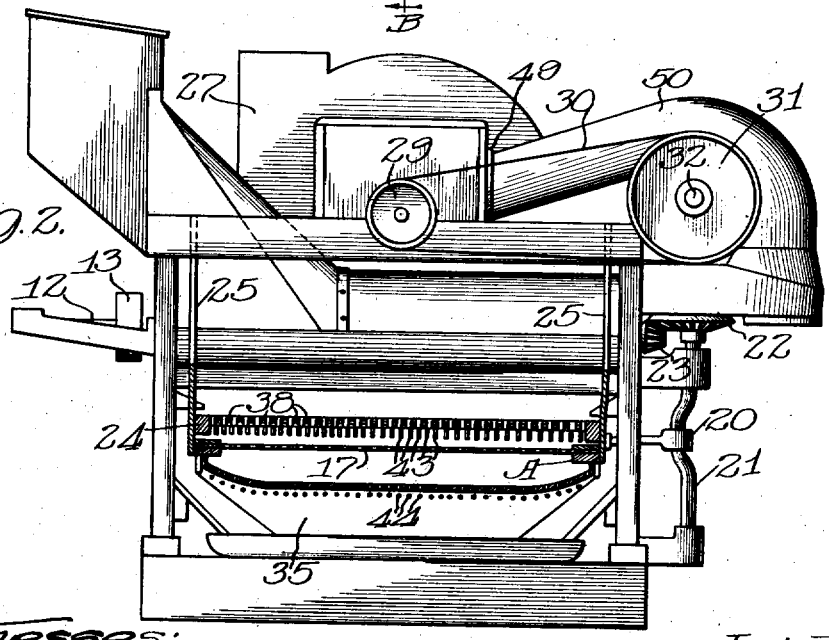
Figure 3:
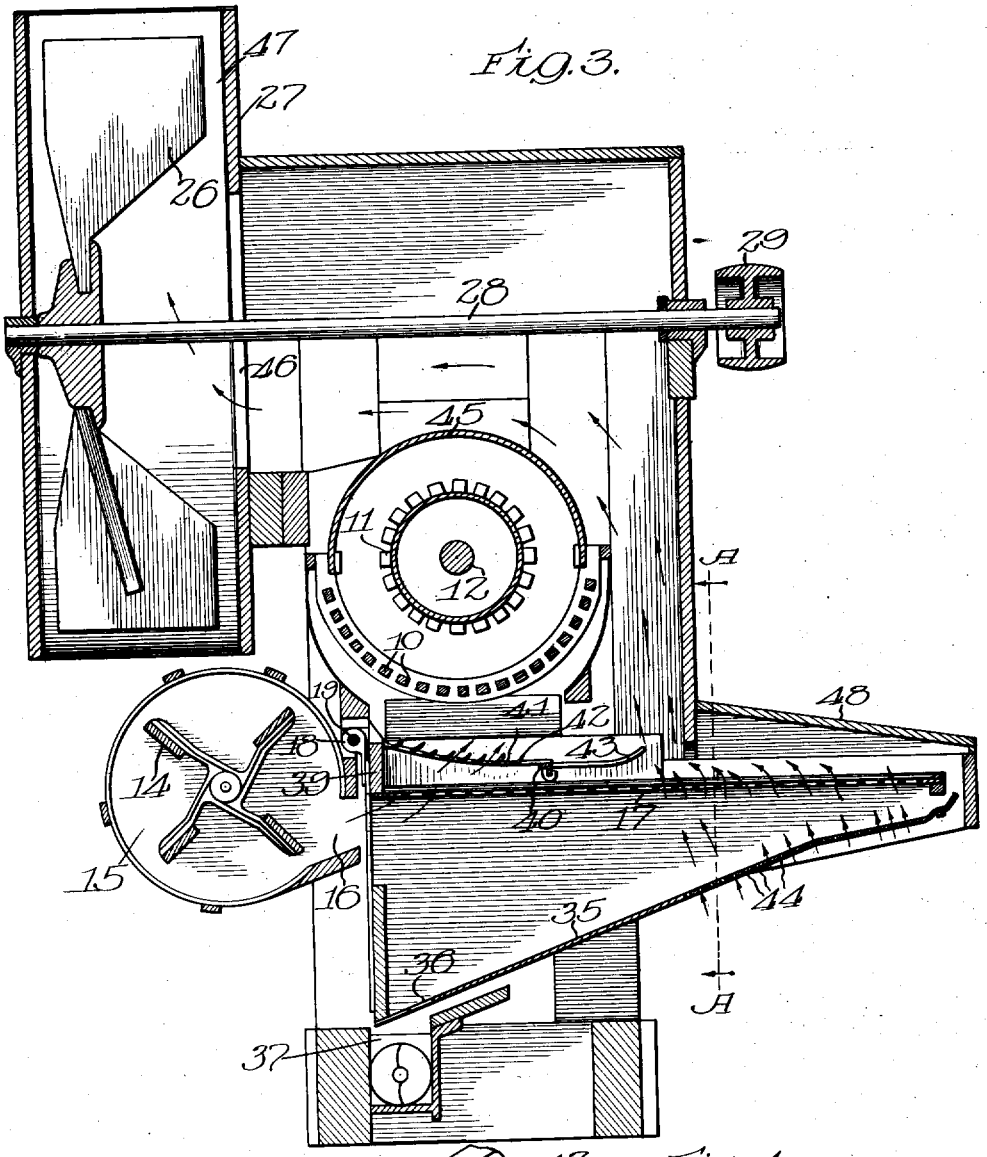
Figure 4:
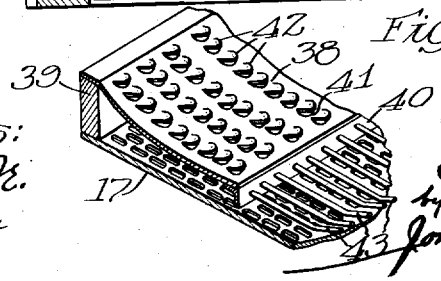

Figure 1 is a rear elevation of a corn sheller containing my invention, but with the blast fan omitted; Fig. 2 is a front elevation of the same machine, but with a portion thereof in section on the line A—A of Fig. 3, and with some of the casing removed; Fig. 3 is a vertical section on an enlarged scale, on the line B—B of Fig. 1; and Fig. 4 is a perspective view of a portion of the screen.

I have, for convenience, shown my invention as applied to the well-known "Ottawa" sheller, although it will be apparent that it could be applied to other differently arranged shellers. As shown, the main elements of this sheller are the concave 10 into which the ears of corn are delivered to be operated upon by the shelling cylinder 11, which is rigidly secured on the central shaft 12 extending lengthwise of the machine and journaled in suitable bearings, and to which power may be applied in any suitable manner, as by a belt wheel (not shown) on it adjacent the belt wheel 13. A blast or winnower fan 14 driven by suitable belt and wheel connections (not shown) from the wheel 13 is secured upon the rear of the sheller and mounted in a suitable casing 15 so as to direct a blast of air through the exit aperture 16 against the under side of the screen 17, which is slidingly mounted by means of the ears 18 on the bearing rods 19, and which is reciprocated by means of the arm 20 mounted upon the vertical crank shaft 21 journaled in suitable bearings and driven by means of the bevel gear 22 from the miter gear 23 secured on the end of the shaft 12. The fan 14 is, of course, rotated in the proper direction by the above mentioned connections from the driving shaft 12. In addition to the supporting ears 18, the screen frame 24 is also supported by the spring arms 25 in the customary manner. A suction or exhaust fan 26 is mounted in the suction fan casing 27 upon the shaft 28, which is rotated at the proper rate of speed by means of the belt wheel 29, belt 30 and belt wheel 31 secured upon the shaft 32 driven by means of the bevel gear 33 from the bevel gear 34 on the upper end of the crank shaft 21.

The screen, when constructed in accordance with my invention, consists of the plain perforated plate 17, whose perforations over its entire surface are of the proper size to permit the grains of corn to drop therethrough upon the inclined bottom 35, from which it falls through the aperture 36 into the conveyer trough 37, by which the shelled corn is delivered from the machine. In addition to the main screen plate 17, I provide the auxiliary plate 38, best seen in figure 4, which extends under that portion of the concave which discharges the most corn, and which is preferably slightly inclined and curved, as shown, and which is secured at its rear end to the back side 39 of the screen casing, and at its front end to the angle bar 40 extending across the screen-frame casing at a short distance above the screen 17. This screen 38 has the large perforations 41, covered by the tongues 42, which are preferably struck out of the sheet in forming the perforations. These tongues project forwardly and upwardly so as to not interfere with the passage of the air from the blast fan, and so as to prevent the silks and fine husks from lodging thereon, as they would be apt to do if the tongues pointed downward or rearward. I also preferably provide in connection with this auxiliary screen plate 38 the screen wires 43, which extend forward from and are supported by the angle bar 40, and are preferably curved upward slightly at their outer ends, as shown. In carrying out my invention, I also preferably provide in the forward portion of the inclined bottom 35 the very fine perforations 44, which permit the air to be sucked up through them by the fan 26, but which are too fine to permit the grains of corn to pass therethrough. Extending from the side of the casing and below the outer edges of the screen 17 and the inclined bottom 35 is a hood 48 which is provided to insure the updraft indicated by the arrows.

The operation of my improved invention will now be readily apparent, as it will be seen that the grains of corn and the silks and any fine husks which may be left on the ears will fall through the spaces between the bars making up the concave upon the auxiliary screen plate 38 or the wires 43, most of it, however, falling upon the auxiliary plate 38. The grains of corn will slide down the plate, owing to the incline, and as the plate vibrates from side to side they will be shaken beneath the tongues 42 and fall readily through the apertures 41 upon the screen plate 17, through which they will sooner or later pass and, falling on the bottom 35, will eventually be delivered to the conveyer trough 37. The silks and light husks will be blown off of the tongues 42 and will not pass through the apertures 41, but will pass down on to the wires 43, which finally serve to separate out any grains of corn that may have accidentally passed the plate 38. As the silks and fine husks pass off of the wires 43, they are met by the strong current of air being drawn upward through the apertures 44 by means of the suction fan 26, so that they are carried up over the concave, which is covered by the semi-cylindrical shell 45 so that the silks and fine husks pass freely thereover and through the large central aperture 46 leading to the fan casing 27, from which they are discharged through the exit aperture 47 to whatever means is used for carrying them off.

It will, of course, be understood that between the upper portion of the casing and the shell 45 is formed a wind passage leading from the winnower fan and screen to the exhaust fan, so that the air currents through the machine are concentrated and controlled. This upper portion of the casing is imperforate except for the opening 46 to the fan casing and for the opening thereinto at 49 (see Fig. 2) of the customary suction trunk 50 extending to and opening over the receiving end of the customary cob conveyer (not shown), so that the suction fan will draw to it through the trunk 50 any loose husks, silks, etc., which may be discharged with the cobs from the shelling cylinder. The presence of this trunk 50 and its opening into the casing does not, however, materially interfere with the hereinbefore described draft from the screens up over the top of the concave and into the suction fan casing.

While I have shown and described my invention as embodied in the form which I at present consider best adapted to carry out its purposes, it will be understood that it is capable of modification and that I do not desire to be limited in the interpretation of the following claims except as may be necessitated by the state of the prior art.

What I claim as new and desire to secure by Letters Patent of the United States is:

1. In a device of the class described, the combination with a shelling concave, of the main screen extending beneath and beyond the concave to one side thereof, the shorter auxiliary screen extending beneath the shelling concave and above the receiving side of the main screen, a blast fan for forcing air transversely of the shelling concave and through the auxiliary screen and a portion of the main screen beneath said auxiliary screen, a suction fan for drawing air up through the main screen, beyond and past the edge of the auxiliary screen, and a casing surrounding the shelling concave and imperforate above said concave except as described.

2. In a device of the class described, the combination with the shelling concave, of the main screen extending beneath and beyond the concave to one side thereof, the shorter auxiliary screen extending beneath the shelling concave and above the receiving side of the main screen and terminating in the wires having their free ends directed upwardly, a blast fan for forcing air transversely of the shelling concave and through the auxiliary screen and the portion of the main screen beneath said auxiliary screen, a suction fan for drawing air up through the main screen, beyond and past the wires constituting the edge of the auxiliary screen, and a casing surrounding the shelling concave and imperforate above said concave except as described.

3. In a device of the class described, the combination with the shelling concave, of the main screen extending beneath and beyond the concave to one side thereof, the shorter auxiliary screen extending beneath the shelling concave and above the receiving side of the main screen, a blast fan for forcing air transversely of the shelling concave and through the auxiliary screen and the portion of the main screen beneath said auxiliary screen, a suction fan for drawing air up through the main screen, beyond and past the edge of the auxiliary screen, the plate beneath the main screen having the imperforate portion beneath the auxiliary screen and the perforated portion beneath the portion of the main screen extending beyond the shelling concave, and a casing surrounding the shelling concave and imperforate above said concave except as described, and including the hood extending out over the perforated portion of the plate.

4. In a device of the class described, the combination with the shelling concave having the upper portion thereof closed, of the main screen extending beneath and beyond the concave to one side thereof, the shorter auxiliary screen extending beneath the shelling concave and above the receiving side of the main screen, a blast fan for forcing air transversely of the shelling concave and through the auxiliary screen and the portion of the main screen beneath said auxiliary screen, a suction fan located above the concave for drawing air up through the main screen, beyond and past the edge of the auxiliary screen and over the shelling concave, and a casing surrounding the shelling concave and imperforate above said concave except as described, and coöperating with the closed upper portion of the shelling concave to form an air passage.

5. In a device of the class described, the combination with the casing having its upper portion imperforate except as described and containing the shelling concave having the upper portion thereof closed to form a passage between the concave and the top of the casing, of the main screen extending beneath and beyond the concave to one side thereof, the shorter auxiliary screen extending beneath the shelling concave and above the receiving side of the main screen, a blast fan for forcing air transversely of the shelling concave and through the auxiliary screen and the portion of the main screen beneath said auxiliary screen, a suction fan located above the concave for receiving the air from the blast fan and for drawing air up through the portion of the main screen not beneath the auxiliary screen, past the edge of the auxiliary screen and through the passage between the concave and the top of the casing, a plate beneath the main screen having the imperforate portion beneath the auxiliary screen and the perforated portion beneath so much of the main screen as extends beyond the shelling concave, and the hood constituting a part of the casing and extending out over the perforated portion of the plate.

FRANK HALL.

Witnesses:
EMIL G. HASSLEY,
WM. S. WATSON.

Copies of this patent may be obtained for five cents each, by addressing the "Commissioner of Patents, Washington, D. C."